US010909054B2

United States Patent
Subbanna et al.

(10) Patent No.: US 10,909,054 B2
(45) Date of Patent: Feb. 2, 2021

(54) METHOD FOR STATUS MONITORING OF ACCELERATION KERNELS IN A STORAGE DEVICE AND STORAGE DEVICE EMPLOYING THE SAME

(71) Applicant: Samsung Electronics Co., Ltd., Suwon-si (KR)

(72) Inventors: Divya Subbanna, Milpitas, CA (US); Vinit Sadanand Apte, Santa Clara, CA (US); Ramdas P. Kachare, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/439,633

(22) Filed: Jun. 12, 2019

(65) Prior Publication Data

US 2020/0341916 A1 Oct. 29, 2020

Related U.S. Application Data

(60) Provisional application No. 62/839,313, filed on Apr. 26, 2019.

(51) Int. Cl.
*G06F 3/06* (2006.01)
*G06F 1/20* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0016* (2013.01); *G06F 2213/0026* (2013.01)

(58) Field of Classification Search
None
See application file for complete search history.

(56) References Cited

U.S. PATENT DOCUMENTS

| 9,977,758 | B1 | 5/2018 | Schumacher et al. |
| 2009/0024816 | A1* | 1/2009 | Thibadeau ............ G06F 3/068 711/167 |
| 2011/0121897 | A1* | 5/2011 | Braithwaite ............ H03F 3/24 330/149 |
| 2013/0054898 | A1* | 2/2013 | Rohe .................. G06F 12/126 711/125 |

(Continued)

FOREIGN PATENT DOCUMENTS

WO 2018/102441 A1 6/2018

*Primary Examiner* — Hyun Nam
(74) *Attorney, Agent, or Firm* — Lewis Roca Rolhgerber Christie LLP

(57) ABSTRACT

A method for status monitoring of acceleration kernels in a storage device is provided. The method includes: receiving an asynchronous event reporting (AER) command by a controller of the storage device from a host, the AER command corresponding to a first operation assigned to a first acceleration kernel on an acceleration co-processor by the host; adding the received AER command to a look-up table in the controller; receiving a completion message from the first acceleration kernel corresponding to the first operation; comparing the received completion message to the AER commands in the look-up table; and when a match is found between the received completion message and one of the AER commands in the look-up table, sending a command completion entry to the host.

24 Claims, 5 Drawing Sheets

(56) References Cited

U.S. PATENT DOCUMENTS

| | | |
|---|---|---|
| 2014/0247175 A1* | 9/2014 | Dasgupta ............ H03M 1/0845 |
| | | 341/155 |
| 2017/0091002 A1 | 3/2017 | Chen et al. |
| 2017/0160986 A1* | 6/2017 | Jayaraman ............ G06F 3/0647 |
| 2018/0074973 A1* | 3/2018 | Chan ........................ G06F 11/00 |
| 2018/0150334 A1* | 5/2018 | Bernat .................. G06F 9/3851 |
| 2018/0219805 A1 | 8/2018 | MacNeil et al. |
| 2018/0267878 A1 | 9/2018 | Guim Bernat et al. |
| 2018/0284996 A1 | 10/2018 | Guim Bernat et al. |

\* cited by examiner

| 31 | 24 | 23 | 16 | 15 | 8 | 7 | 0 | DW |
|---|---|---|---|---|---|---|---|---|
| CID | | | | OPC (AER-Kernel Status) | | | | DW0 |
| NSID | | | | | | | | DW1 |
| | | | | | | | | DW2 |
| | | | | | | | | DW3 |
| | | | | | | | | DW4 |
| | | | | | | | | DW5 |
| | | | | | | | | DW6 |
| | | | | | | | | DW7 |
| | | | | | | | | DW8 |
| | | | | | | | | DW9 |
| Misc | | | | Kernel ID | | | | DW10 |
| | | | | | | | | DW11 |
| | | | | | | | | DW12 |
| | | | | | | | | DW13 |
| | | | | | | | | DW14 |
| | | | | | | | | DW15 |

| B | 31 | 24 | 23 | 16 | 15 | 8 | 7 | 0 | DW |
|---|---|---|---|---|---|---|---|---|---|
| 3 | Kernel Status | | | | | | Kernel ID | | DW0 |
| 7 | Misc Info | | | | | | | | DW1 |
| 11 | SQID | | | | SQHD | | | | DW2 |
| 15 | STS | | | | CID | | | | DW3 |

US 10,909,054 B2

METHOD FOR STATUS MONITORING OF ACCELERATION KERNELS IN A STORAGE DEVICE AND STORAGE DEVICE EMPLOYING THE SAME

CROSS-REFERENCE TO RELATED APPLICATION

This utility patent application claims priority to and the benefit of U.S. Provisional Patent Application Ser. No. 62/839,313, filed Apr. 26, 2019 and entitled "A NOVEL METHOD FOR STATUS MONITORING OF FPGA BASED ACCELERATION KERNELS IN A STORAGE DEVICE," the entire content of which is incorporated herein by reference.

BACKGROUND

1. Field

Aspects of example embodiments of the present disclosure relate to a method for status monitoring of acceleration kernels in a storage device and a storage device employing the method.

2. Related Art

Advancements in computer technology continue to increase the proliferation of electronic devices into all aspects of life. As the amount of information stored electronically (e.g., photos, videos, music, documents, etc.) exponentially increases, users demand faster, almost seamless, access to their stored electronic information. This information may be stored locally or in the "cloud," that is, stored remotely and accessible over the Internet. Efforts are being made to reduce or mitigate all possible bottlenecks between the user and their stored information, including information stored remotely in large storage devices (e.g., server farms, etc.).

Recent advancements in storage technology, in particular solid-state storage devices (e.g., solid-state drives (SSDs)), provide search, read, and write speeds orders of magnitude faster than traditional mechanical storage devices, such as hard disk drives (HDDs) with spinning platters. Further, new protocols for accessing data stored on this new generation of storage devices have been developed, including the Non-Volatile Memory Express (NVMe) protocol.

SUMMARY

The present disclosure is directed toward various embodiments of a method for status monitoring of acceleration kernels in a storage device and a storage device employing the method.

According to an embodiment of the present disclosure, a method for status monitoring of acceleration kernels in a storage device is provided. The method includes: receiving an asynchronous event reporting (AER) command by a controller of the storage device from a host, the AER command corresponding to a first operation assigned to a first acceleration kernel on an acceleration co-processor by the host; adding the received AER command to a look-up table in the controller; receiving a completion message from the first acceleration kernel corresponding to the first operation; comparing the received completion message to the AER commands in the look-up table; and when a match is found between the received completion message and one of the AER commands in the look-up table, sending a command completion entry to the host.

The command completion entry may be configured to alert the host that the first acceleration kernel is idle.

The AER command may be received by the storage device from the host without passing through the acceleration co-processor.

The method may further include receiving a status update message at the controller from the first acceleration kernel after a period of time has passed since the first operation was assigned to the first acceleration kernel.

The method may further include: receiving a status update message at the controller from the first acceleration kernel after a percentage of data processing has been completed since the first operation was assigned to the first acceleration kernel; and sending a second command completion entry to the host from the controller, the second command completion entry indicating the status of the first acceleration kernel.

The method may further include: monitoring a temperature of the acceleration co-processor; and when the temperature of the acceleration co-processor exceeds a reference temperature, delaying the sending of the command completion entry to the host.

The delaying of the sending of the command completion entry may include delaying the sending of the command completion entry until the temperature of the acceleration co-processor is below the reference temperature.

The delaying of the sending of the command completion entry may include delaying the sending of the command completion entry for a period of time.

The method may further include: receiving a plurality of completion messages from a plurality of acceleration kernels; comparing the received completion messages with the AER commands in the look-up table; coalescing the received completion messages having matching AER commands in the look-up table into a single command completion entry; and sending the single command completion entry to the host.

The single command completion entry may be configured to alert the host that the plurality of acceleration kernels are idle.

According to another embodiment of the present disclosure, a system includes: a host; a storage device including a controller and a memory device; and an acceleration co-processor configured to accelerate the storage device. The acceleration co-processor includes a plurality of acceleration kernels. The host is configured to task the acceleration kernels with operations and to send asynchronous event reporting (AER) commands corresponding to the operations to the controller, the controller is configured to build a look-up table including the received AER commands, and the acceleration kernels are configured to send completion messages to the controller after completing their respective operations.

The acceleration co-processor may be integral with the controller.

The controller may be configured to determine whether or not a received completion message matches an AER command in the look-up table and, when a match is found, to build and send an command completion entry to the host corresponding to the received completion message.

The command completion entry may be sent via the NVMe protocol.

The controller may be configured to monitor a temperature of the acceleration co-processor and, when the temperature of the acceleration co-processor exceeds a reference temperature, to delay the sending of the command completion entry.

The acceleration co-processor may be configured to send the completion messages to the controller via a system management bus or an I2C bus.

The host and the controller may be configured to communicate with each other via the PCIe bus.

The host may be configured to concurrently task at least one of the acceleration kernels with a first operation and send an AER command corresponding to the first operation to the controller.

According to another embodiment of the present disclosure, a method of status monitoring for acceleration kernels in storage device in a system is provided. The system includes a host, an acceleration co-processor comprising the acceleration kernels, and the storage device. The method includes: receiving a first operation from the host by a controller of the storage device; passing the first operation onto the acceleration co-processor from the controller; receiving an asynchronous event report (AER) command from the host by the controller of the storage device; reading the AER command and building a look-up table comprising the first operation; and upon completion of the first operation by the acceleration co-processor, sending a completion message to the controller by the acceleration co-processor.

The acceleration co-processor may be integrated in the controller.

The method may further include sending an AER command completion entry to the host from the controller. The AER command completion entry may be configured to inform the host that the first operation is completed.

The acceleration co-processor may send the completion message to the controller over a system management bus.

The controller may be configured to enable quality of service (QoS) with respect to the acceleration kernels.

The method may further include receiving a status update message at the controller from one of the acceleration kernels after a period of time has passed since the first operation was passed to the acceleration co-processor.

The method may further include: receiving a status update message at the controller from one of the acceleration kernels after a percentage of data processing is done after the first operation was passed to the acceleration co-processor; and sending an AER command completion entry to the host indicating the status of the one of the acceleration kernels.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable method or device.

DETAILED DESCRIPTION

Figure 1:
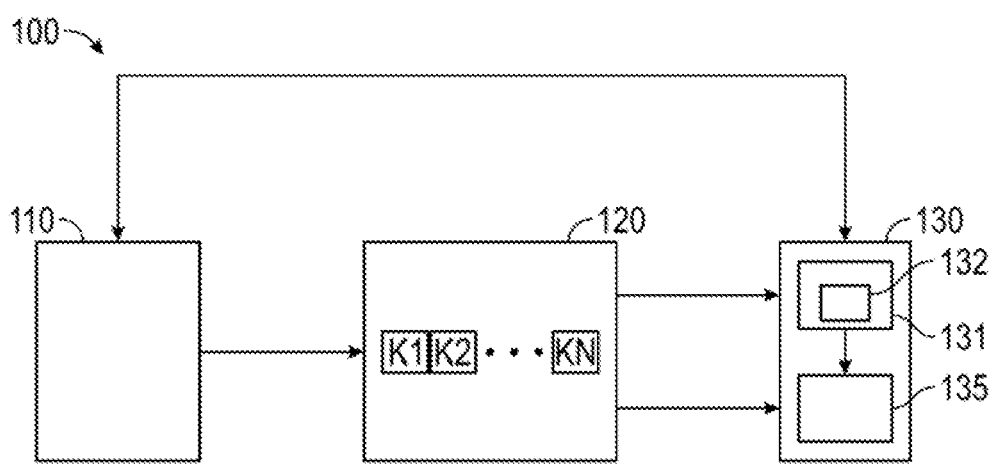
FIG. 1 is a system diagram according to an embodiment of the present disclosure.
Figure 2:
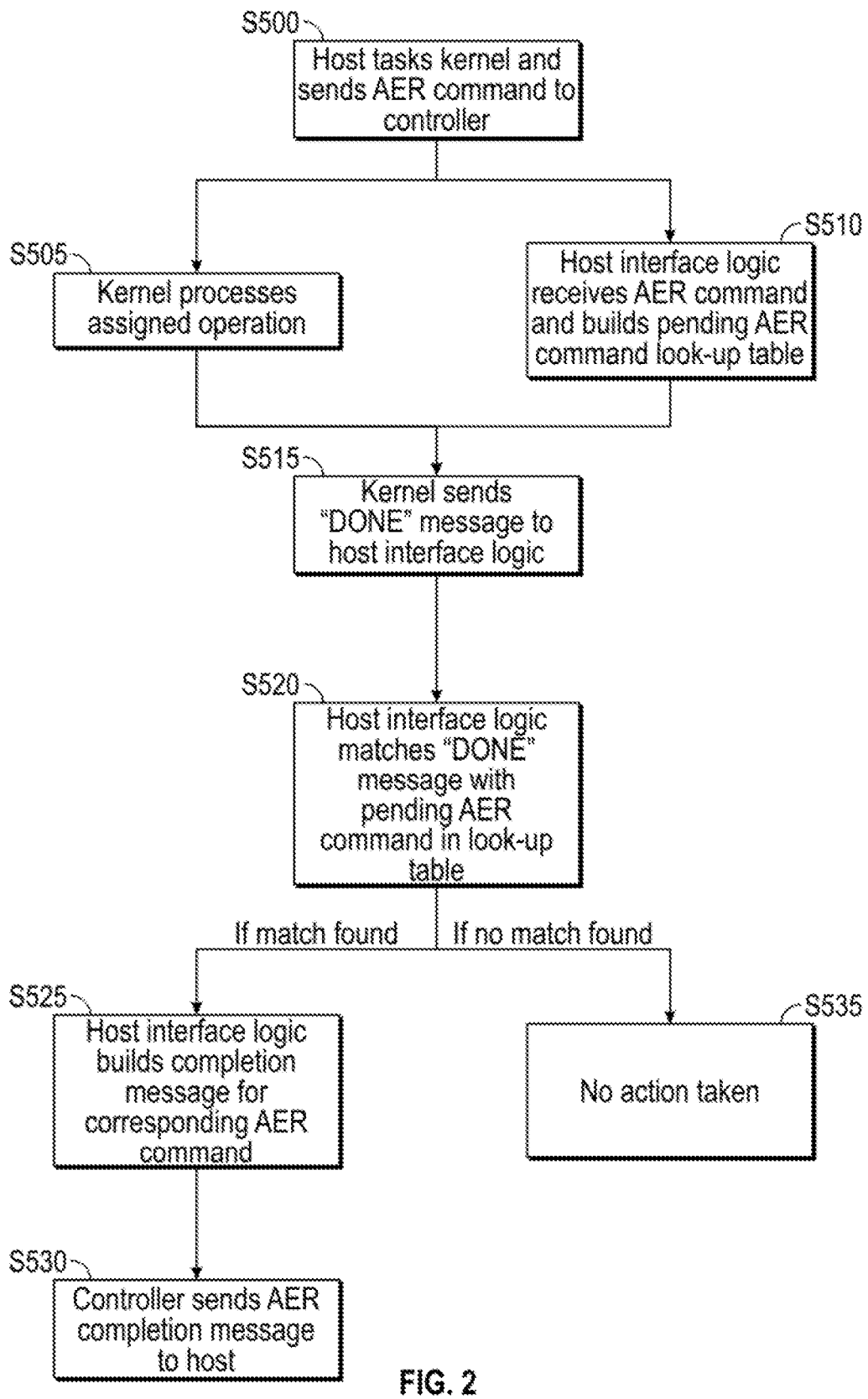
FIG. 2 is a flowchart describing a method according to an embodiment of the present disclosure.

Computational storage is a new, emerging technology that allows certain data processing functions to be offloaded to the storage device (e.g., offloaded from a host to the connected storage device). Moving relatively large amounts of data to a host for processing is an expensive operation in terms of host memory bandwidth, host bus bandwidth, amount of power or energy consumed, etc. Further, processing relatively large amounts of data on a CPU (e.g., on a host CPU) is expensive in terms of CPU cycles and may increase latency. Hence, processing data in the storage device, to the extent possible, provides a more efficient system architecture by, for example, allowing the data to processed nearer to where it is stored. In such a system architecture, a host invokes various kernels (e.g., data processing engines) embedded in the storage device and monitors the progress of these kernels as they complete their assigned tasks. The invocation (or tasking) of a kernel or other data processing function in the storage device and the monitoring of kernel status may be performed as two different commands or processes. For example, the kernel invocation is non-blocking in nature (e.g., the invocation of an offloaded data processing function may be a two-phase execution model).

The present disclosure is directed toward various embodiments of a method for status monitoring (e.g., completion status monitoring) of acceleration kernels in a storage device and a storage device employing the method. According to embodiments of the present disclosure, each of a plurality of kernels (e.g., acceleration kernels) on a co-processor (e.g., an acceleration co-processor) of an accelerated storage device communicates with a storage controller of a connected storage device to inform the controller when it has completed an operation. Put another way, each kernel sends a completion message (e.g., a "DONE" message) to the corresponding storage controller when it has completed an operation. The storage controller then matches the completion message received from the kernels of the co-processor with a pending AER (asynchronous event reporting) command using a look-up table, and when a match is found, the storage controller sends an AER completion response (e.g., an AER completion entry) to the host indicating that a corresponding kernel is done with its operation. Generally, kernels of the co-processor communicate with the host directly over a PCIe bus, causing a bottleneck on the PCIe bus and at the host, thereby decreasing available system resources. According to embodiments of the present disclosure, the kernels send completion messages to the storage controller, which then sends the AER completion response corresponding to the AER command to the host, thereby preventing the kernels from saturating the PCIe bus with completion messages to the host and preventing the host from having to poll the kernels to be updated as to their status. The methods provided according to embodiments of the present disclosure allow a host to use the same storage driver (e.g., storage software stack) to monitor the status of data processing functions offloaded to a storage device. Such storage devices are also known as Computation Storage (CS) devices.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, and/or layers, these elements, components, and/or layers should not be limited by these terms. These terms are used to distinguish one element, component, etc. from another element, component, etc. Thus, a first element or component described below could be termed a second element or component without departing from the scope of the present disclosure.

It will be understood that when an element or component is referred to as being "connected to" or "coupled to" another element or component, it may be directly connected or coupled to the other element or component or one or more intervening elements or components may also be present. When an element or component is referred to as being "directly connected to" or "directly coupled to" another element or component, there are no intervening element or component present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A processor, central processing unit (CPU), graphics processing unit (GPU), field-programmable gate array (FPGA), hard disk drive (HDD), solid-state drive (SSD), and/or any other relevant devices or components according to embodiments of the present disclosure described herein may be implemented utilizing any suitable hardware (e.g., an application-specific integrated circuit), firmware, software, and/or a suitable combination of software, firmware, and hardware. For example, the various components of the processor, CPU, GPU, FPGA, HDD, and/or the SSD may be formed on (or realized in) one integrated circuit (IC) chip or on separate IC chips. Further, the various components of the processor, CPU, GPU, FPGA, HDD, and/or the SSD may be implemented on a flexible printed circuit film, a tape carrier package (TCP), a printed circuit board (PCB), or formed on the same substrate as the processor, CPU, GPU, FPGA, HDD, and/or SSD. Further, the described actions may be processes or threads, running on one or more processors (e.g., one or more CPUs, GPUs, FPGAs, etc.), in one or more computing devices, executing computer program instructions and interacting with other system components to perform the various functionalities described herein. The computer program instructions may be stored in a memory, which may be implemented in a computing device using a standard memory device, such as, for example, a random access memory (RAM). The computer program instructions may also be stored in other non-transitory computer readable media such as, for example, a CD-ROM, flash drive, HDD, SSD, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present disclosure.

To offload some tasks from the central processing unit (CPU) in a host storage devices have recently been paired with (e.g., connected to) local or near-local co-processors (e.g., acceleration co-processors), such as field-programmable gate arrays (FPGAs), graphics processing units (GPUs), etc., that operate alongside (e.g., in conjunction with) the local controller to improve access times and read and write speeds. These co-processors may include a plurality of kernels (e.g., acceleration kernels) for performing certain functions. Storage devices including one or more co-processors may be referred to accelerated storage devices (e.g., "FPGA-accelerated storage devices" when the co-processor is a FPGA). In some embodiments, the kernels may be embedded in (e.g., integral in) the controller of the storage device or they may be part of a separate co-processor. The methods discussed herein are applicable to embodiments in which the kernels are embedded in the controller of the storage and embodiments in which the kernels are in a separate co-processor.

By using local or near-local co-processors to control (e.g., handle, execute, etc.) some aspects of the offloaded data processing functions in a storage device, CPU and storage device controller overhead can be reduced, allowing these components to perform other tasks. Further, overall system power consumption may be reduced because the co-processor may be less power-intensive (or more power efficient) than the CPU.

However, in accelerated storage devices, the host should be aware of the status of each of the kernels on the storage device or co-processor to ensure optimum performance. The host monitors kernel status to provide efficient response latencies to applications while also optimizing host CPU cost and resources. By efficiently monitoring the kernels, the host may provide improved or maximum utilization of the storage device resources and improved or optimal system performance.

Generally, a host (e.g., the CPU of the host) periodically checks that status of each kernel on the accelerated storage device over, for example, the PCIe bus, so that it is aware of the status of the kernels. This approach may be referred to as "polling." While this approach apprises the host of the status of each kernel, it requires a substantial amount of transport (e.g., PCIe) bandwidth and CPU overhead, thereby negatively affecting overall system performance. In other cases, the kernels may generate interrupts over the transport (e.g., PCIe) bus to inform the host of their individual statuses. Again, this approach apprises the host of the status of each kernel, but interrupts must be carefully setup and introduce another layer of complexity to the storage device/host communication stack (or protocol). For example, interrupt data loss and/or corruption is possible if the interrupts are not handled properly and/or interrupts may delay host code execution, making it difficult to calculate the execution time of host code. Further, a computational storage device may generally include multiple kernels, and each kernel needs its own interrupt such that the host must service each interrupt on priority. These approaches also require a different software stack on the host, in addition to the storage stack, adding further complexity. The methods described herein are not limited to the PCIe bus and are applicable to other suitable transport technologies, such as Ethernet, TCP/IP, Fiber Channel, NVMe over Fabrics, NVMe over TCP, etc. For example, the proposed methods may be agnostic to the transport method of the storage device.

Referring to FIG. 1, a system 100 includes a host 110, a co-processor (e.g., a storage co-processor or acceleration co-processor) 120, and a storage device 130. In one embodiment, the co-processor 120 is located in-line or in front of the storage device 130. For example, the host 110 may communicate with the storage device 130 through the co-processor 120, and the co-processor 120 may provide pass-through of host storage commands to the storage device 130. In some embodiments, the co-processor 120 may be housed with (e.g., may be integral with) the storage device 130. In other embodiments, the co-processor 120 may be separate from the storage device 130 and connected therewith via one or more buses, as discussed further below.

The co-processor 120 may be a field programmable gate array (FPGA), a graphics processing unit (GPU), or central processing unit (CPU) co-processor. The host 110 may include a processor, such as a central processor unit (CPU), and a memory. The storage device 130 may include a controller (e.g., a storage controller or SSD controller) 131 and a memory device 135. The controller 131 may include host interface logic (HIL) 132. The memory device 135 may include one or more flash memory cells. For example, the storage device 130 may be a solid-state storage device (SSD), and the memory device 135 may include a plurality of NAND memory cells connected to the controller 131.

The co-processor 120 and the controller 131 may operate cooperatively, as such, the co-processor 120 may be an accelerator and/or an acceleration co-processor for the controller 131. The co-processor 120 includes one or more kernels (e.g., acceleration kernels) K1, K2, . . . , KN. Each of the kernels K1, K2, . . . , KN may be configured to perform an independent operation (e.g., an individual or specific acceleration operation) based on instructions received from the host 110 and/or from the controller 131. In another embodiment, the controller 131 may include integrated or embedded kernels (e.g., acceleration kernels) with or without an external co-processor.

In some embodiments, the host 110 communicates with the co-processor 120 and the storage device 130 via a Peripheral Component Interconnect Express (PCIe) interface (e.g., PCIe bus). In some embodiments, the host 110 may communication with the co-processor 120 and/or the storage device 130 via an Ethernet bus or any other suitable bus as discussed above.

In some embodiments, the host 110 may communicate directly with the co-processor 120 via the PCIe bus. The co-processor 120 and the controller 131 may communicate with each other via an I2C protocol (e.g., I2C bus), system management bus (SMBus), the PCIe bus, and/or any other suitable proprietary bus that is capable of, for example, transmitting status messages.

In use, the host 110 should be kept apprised of the status of each kernel K1, K2, . . . , KN on the co-processor 120 to ensure optimal performance of the co-processor 120 and the storage device 130. For example, the host 110 should be aware when one of the kernels K1, K2, . . . , KN is untasked (e.g., when one of the kernels K1, K2, . . . , KN has completed a previously-assigned operation and/or is idle) so that it can be re-tasked (e.g., so that it may be assigned a new operation). Without being aware of the status of each of the kernels K1, K2, . . . , KN, the host 110 may under- or over-task the kernels K1, K2, . . . , KN of the co-processor 120, causing an under-utilization of processing resources of the co-processor 120. However, bidirectional communication between the co-processor 120 and the host 110 may saturate the PCIe bus, causing system slowdowns. Further, such bidirectional communication may not efficiently apprise the host 110 when a kernel K1, K2, . . . , KN has completed an operation because the host 110 will either need to regularly poll the kernels K1, K2, . . . , KN to determine if they have completed an operation or the kernels K1, K2, . . . , KN will need to send an interrupt to the host 110 when they have completed their assigned operation, forcing the host 110 to prioritize the interrupts over other pending operations.

Figures 5, 6, 7:
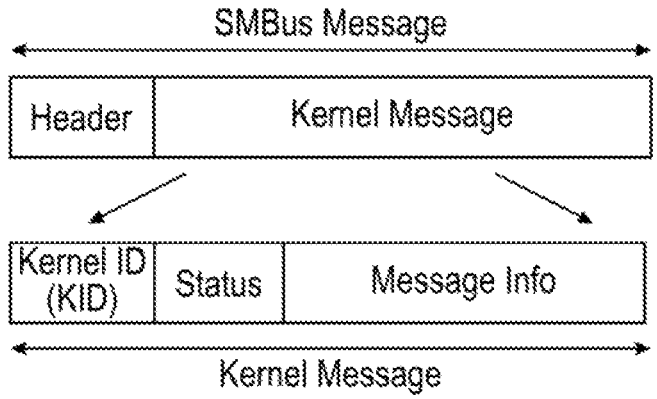
FIG. 5 is a diagram of an example system management bus (SMBus) message according to an embodiment of the present disclosure.
FIG. 6 is an example of an AER command according to an embodiment of the present disclosure.
FIG. 7 is an example of an AER completion command according to an embodiment of the present disclosure.

According to an embodiment, a method for status monitoring of acceleration kernels in a storage device includes the host 110 assigning an operation to (e.g., tasking) one of the kernels K1, K2, . . . , KN on the co-processor 120 via the PCIe bus (S500). The kernel tasking (e.g., the kernel invocation command) and/or method used by host to accomplish the kernel tasking may be accomplished by any suitable method known to those skilled in the art. For ease of convenience, it will described that the first kernel K1 is assigned a first operation as an example, but the host 110 may assign any of the kernels K1, K2, . . . , KN an operation. The host 110 also sends an AER (asynchronous event reporting) command (e.g., a vendor-specific AER command or custom NVMe AER command) corresponding to the assigned first operation to the controller 131 via the PCIe bus (S500), bypassing the co-processor 120. An example of the AER command sent by the host 110 to the controller 131 is shown in FIG. 6. The AER command may inform the controller 131 that, in this example, the first kernel K1 has been tasked with an operation. In some embodiments, the host 110 may concurrently assign the first kernel K1 the first operation and send the corresponding AER command to the controller 131.

Next, the first kernel K1 processes the assigned first operation (S505). While the first kernel K1 is processing the first operation, the host interface logic 132 on the controller 131 receives the AER command from the host 110 and builds a look-up table of all pending AER commands, which represent the currently tasked kernels K1, K2, . . . , KN (S510).

In some embodiments, the AER command sent to the controller 131 from the host 110 may include a vendor-specific opcode (e.g., a command ID (CID)), kernel ID (KID), wildcard bit set/unset, and/or a KID value that may be used as a wildcard (e.g., 0xFFFF) (see, e.g., FIG. 6). When the AER command has a KID and a wildcard bit, the wildcard bit is ignored.

When the first kernel K1 completes its assigned operation, it sends a completion message (e.g., a "DONE" message) to the host interface logic 132 on the controller 131 via the I2C, SMBus, PCIe, or other suitable proprietary bus (S515). An example of the completion message is shown in FIG. 5.

Referring to FIG. 5, the completion message may include a header and a kernel message. The kernel message may include a kernel ID (KID) indicating from which kernel the message originated, the current status of the kernel (e.g., "done" when idle, error ("err") when still active, or current progress percentage level), and any other suitable message info.

Upon receiving the completion message, the host interface logic 132 analyzes the KID field of the received completion message to determine from which of the kernels K1, K2, . . . , KN the message originated and attempts to match the received completion message with one of the pending AER commands in the look-up table (S520).

When the host interface logic 132 determines that a pending AER command in the look-up table matches the received completion message, for example, when a pending AER command in the look-up table and a received completion message have the same KID or when a wildcard match exists between the AER command and the received completion message, the host interface logic 132 builds a command completion entry (e.g., a command completion message, AER command completion entry, or custom NVMe command completion entry) (S525). An example AER completion entry is shown in FIG. 7. In some embodiments, the command completion entry may be an NVMe command completion entry.

Then, the controller 131 sends the command completion entry to the host 110 (S530). The command completion entry may be sent to the host 110 via the PCIe bus or other suitable transport bus, which also transmits the AER commands to the controller 131. In some embodiments, the command completion entry is sent from the controller 131 to the host 110 via the PCIe bus such that the command completion entry bypasses the co-processor 120, unburdening the co-processor 120 from communicating back to the host 110.

When the host interface logic 132 determines that no pending AER command exists in the look-up table matching the received completion message (e.g., no matching KID or wildcard is found), no action is taken by the host interface logic 132 and/or the controller 131 with respect to the received completion message (e.g., no command completion entry is built or sent) (S535).

When a plurality of the kernels K1, K2, . . . , KN concurrently (e.g., simultaneously or near-simultaneously) complete their respective operations and a plurality of completion messages are queued at the host interface logic 132, the host interface logic 132 and/or the controller 131 may coalesce the completion messages from the plurality of kernels K1, K2, . . . , KN into a single command completion entry to be sent to the host 110, thereby reducing or minimizing the bandwidth for communicating with the host 110. Such kernel completion may be performed under host guidance so as to reduce host overhead(s).

According to embodiments of the present disclosure, the host 110 remains unaware of the status of each of the kernels K1, K2, . . . , KN in the co-processor 120 until the host 110 receives a command completion entry from the controller 131. For example, the host 110 is aware when it assigns an operation to, as one example, a first kernel K1, but the host 110 is not aware of the status of the first kernel K1 (e.g., is not aware of how far along the first kernel K1 is toward completing its assigned task) until it receives the corresponding command completion entry from the controller 131, indicating to the host 110 that the first kernel K1 is available for subsequent tasking. According to embodiments, the host 110 does not need to repeatedly inquire as to the status of the kernels K1, K2, . . . , KN, thereby freeing the host 110 for other tasks. Here, the controller 131 informs the host 110 when each kernel K1, K2, . . . , KN has completed its task and is idle, thereby informing the host 110 that the kernel K1, K2, . . . , KN is available for subsequent tasking and ensuring the kernels K1, K2, . . . , KN are efficiently tasked by reducing or minimizing time the kernels K1, K2, . . . , KN are idle. Further, the storage stack already operating in the host 110 may be utilized to receive the command completion entries, such that a separate stack to operate in the host 110 to communicate with the kernels is not necessary, such as when the PCIe interrupt communication method is used.

In some embodiments, the controller 131 may enable quality of service (QoS) selection when a plurality of completion messages are concurrently (e.g., simultaneously or near-simultaneously) received from the kernels K1, K2, . . . , KN. For example, ones of the kernels K1, K2, . . . , KN may be assigned a higher priority than other ones of the kernels K1, K2, . . . , KN, and in such an embodiment, the command completion entries corresponding to the higher priority kernels K1, K2, . . . , KN will be built and transmitted to the host 110 before the command completion entries corresponding to the lower priority kernels K1, K2, . . . , KN are built and sent to the host 110. In other embodiments, a round robin policy may be used when a plurality of completion message are concurrently received from the kernels K1, K2, . . . , KN. The QoS policy may be set by the host 110 and/or by the storage device 130.

In some embodiments, the controller 131 may track (e.g., may monitor) individual kernel performance and/or parameters. For example, the controller 131 may track kernel invocations, kernel performance, host usage of kernels, etc. In some embodiments, the controller 131 may monitor the temperature of the co-processor 120, and when the monitored temperature exceeds a reference temperature, the controller 131 may delay sending one or more command completion entries to the host 110 to allow the co-processor 120 and/or individual kernels K1, K2, . . . , KN to remain idle for a period of time, thereby allowing them to cool off and preventing damage. This method may be combined with the QoS ranking, such that the controller 131 may delay sending the command completion entries corresponding to the lower priority kernels K1, K2, ..., KN while not delaying the sending of the command completion entries corresponding to the higher priority kernels. By delaying the sending of the command completion entries to the host 110, the host 110 is unaware that the kernels K1, K2, ..., KN have completed their assigned operations and, therefore, refrains from subsequently tasking some or all of the kernels K1, K2, ..., KN even though the kernels K1, K2, ..., KN are idle. In some embodiments, the controller 131 may withhold the command complete entries until the monitored temperature of the co-processor 120 falls below the reference temperature. This operation may be referred to as kernel throttling or co-processor throttling. This throttling method is also applicable when the kernels are integrated or embedded in the controller 131.

In some embodiments, the controller 131 may communicate the status of the kernels K1, K2, ..., KN to the host 110 on a regular basis, for example, every 1 μs, every 10 μs, etc. In such an embodiment, a single kernel task may utilize a plurality of different (e.g., custom) AER command entries to periodically inform the host regarding current data processing progress. For example, a kernel may send its current progress level to the controller 131 every 1 μs, or a kernel may send a progress report at, for example, 25%, 50%, 75%, and 100% completion.

In some embodiments, the controller 131 may send an AER completion entry upon kernel K1, K2, ..., KN milestone completion. For example, when a tasked kernel (e.g., a first kernel K1) reaches a milestone in completing its assigned task (or operation), it may report the milestone completion to the host interface logic 132 and/or the controller 131, and the controller 131 may report this milestone completion to the host 110. The manner and periodicity of such progress reporting may be set by the host 110 depending upon application requirements, user desires, etc. Such kernel progress reporting methods are also applicable when the kernels are implemented as integrated or embedded in the controller 131.

To reduce or minimize the host 110 processor overhead when using this method, the status of each of the kernels K1, K2, ..., KN may be coalesced into a single message that is sent on a regular (e.g., scheduled) basis, thereby reducing communication and processor overhead.

Further, the methods described herein are applicable to embodiments in which the kernels K1, K2, ..., KN are a part of (e.g., are integral with) the controller 131.

Figure 3:
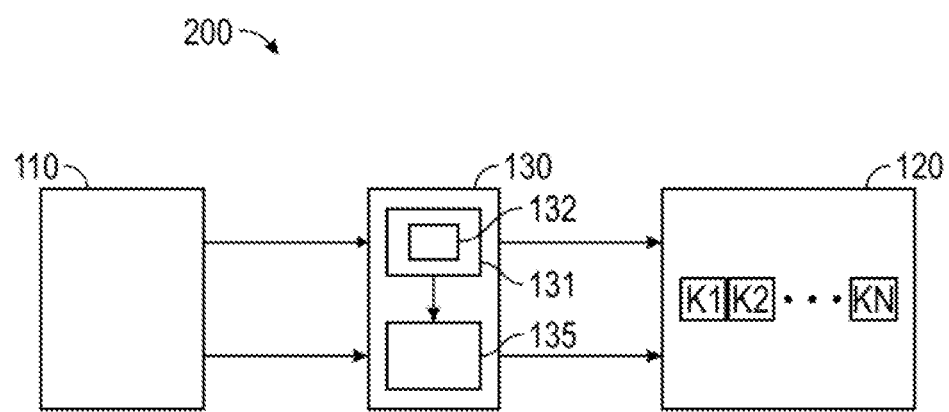
FIG. 3 is a system diagram according to an embodiment of the present disclosure.
Figure 4:
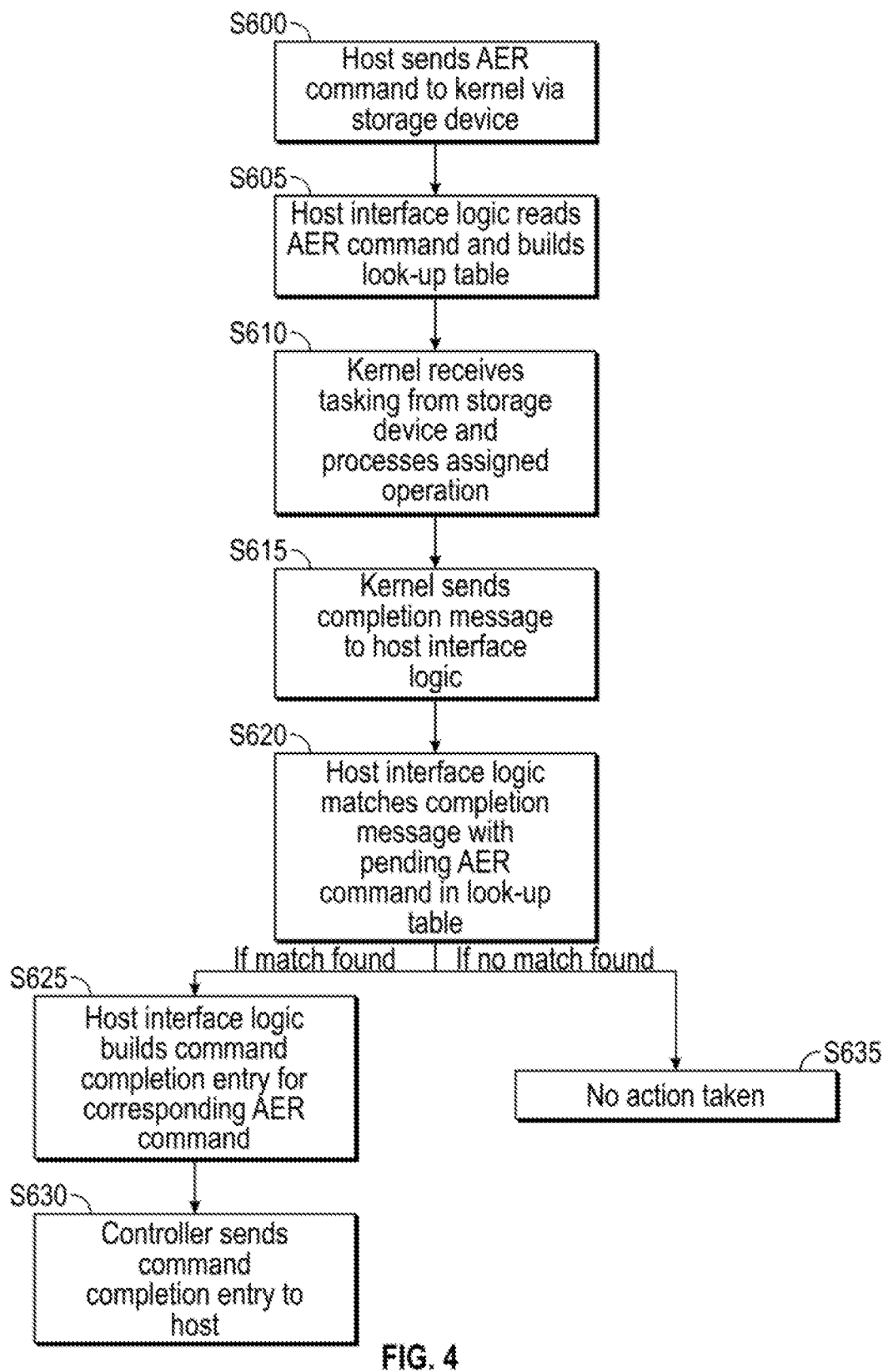
FIG. 4 is a flowchart describing a method according to an embodiment of the present disclosure.

Referring to FIG. 3, a system diagram according to another embodiment of present disclosure is shown. Different from the embodiment shown in FIG. 1, in the system 200 shown in FIG. 3, the host 110 communicates directly with the storage device 130 via the I2C/SMBus and the PCIe bus (and/or an Ethernet bus or any other suitable bus), and the storage device 130 communicates with the co-processor 120 via the SMBus and/or a proprietary bus configured to transmit status messages. Thus, the host 110 indirectly communicates with the co-processor 120 via the storage device 130. Put another way, in the system 200, the host 110 may not directly communicate with the co-processor 120, instead the host 110 and the co-processor 120 indirectly communicate with each other via the storage device 130 (e.g., via the controller 131).

According to an embodiment, a method for status monitoring of kernels (e.g., acceleration kernels) in a storage device includes the host 110 sending an AER command to the co-processor 120 via the storage device 130 (S600). The storage device 130 (e.g., the host interface logic 132 on the controller 131) may read the input AER command and build a look-up table. The host 110 may use an independent command or method to invoke the kernels through the controller 131. For example, the controller 131 may receive a kernel invocation command from the host 110 and it may in turn use proprietary commands or methods to invoke kernels implemented in the external co-processor 120 and/or kernels that are integrated or embedded in the controller 131. The assigned kernel (e.g., the first kernel K1) then processes the assigned data processing command (S610). Similar to the previously-described embodiment, when the assigned kernel (e.g., the first kernel K1) completes the assigned operation, it sends a completion message (e.g., a "DONE" message) to the host interface logic 132 via the SMBus, I2C bus, and/or another suitable proprietary bus (S615). The host interface logic 132 then determines whether or not an AER command exists in the look-up table corresponding to the received completion message (S620). When a match is found, the controller 131 builds and sends a command completion entry to the host 110 via the SMBus and/or the PCIe bus (or via an Ethernet connection, etc.), thereby informing the host 110 that the assigned kernel (e.g., the first kernel K1) is now idle and ready to accept subsequent tasking (S625 and S630). When the host interface logic 132 determines that no pending AER command exists in the look-up table matching the received completion message (e.g., no matching KID or wildcard is found), no action is taken by the host interface logic 132 and/or the controller 131 with respect to the received completion message (e.g., no command completion entry is built or sent to the host 110) (S635).

Although the present disclosure has been described with reference to the example embodiments, those skilled in the art will recognize that various changes and modifications to the described embodiments may be made, all without departing from the spirit and scope of the present disclosure. Furthermore, those skilled in the various arts will recognize that the present disclosure described herein will suggest solutions to other tasks and adaptations for other applications. It is the applicant's intention to cover, by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims and their equivalents.

What is claimed is:

1. A method for status monitoring of acceleration kernels in a storage device, the method comprising:
    receiving a first operation by a first acceleration kernel on an acceleration co-processor from a host;
    receiving an asynchronous event reporting (AER) command by a controller of the storage device from the host, the AER command corresponding to the first operation assigned to the first acceleration kernel on the acceleration co-processor;
    adding the received AER command to a look-up table in the controller;
    sending, from the first acceleration kernel on the acceleration co-processor, a completion message to the controller, the completion message corresponding to the first operation;
    receiving, by the controller, the completion message from the first acceleration kernel corresponding to the first operation;

comparing the received completion message to the AER command in the look-up table; and in response to a match being found between the received completion message and the AER command in the look-up table, sending a command completion entry to the host from the controller.

2. The method of claim 1, wherein the command completion entry is configured to alert the host that the first acceleration kernel is idle.

3. The method of claim 1, wherein the AER command is received by the storage device from the host without passing through the acceleration co-processor.

4. The method of claim 1, further comprising receiving a status update message at the controller from the first acceleration kernel after a period of time has passed since the first operation was assigned to the first acceleration kernel.

5. The method of claim 1, further comprising:
receiving a status update message at the controller from the first acceleration kernel after a percentage of data processing has been completed since the first operation was assigned to the first acceleration kernel; and
sending a second command completion entry to the host from the controller, the second command completion entry indicating the status of the first acceleration kernel.

6. The method of claim 1, further comprising:
monitoring a temperature of the acceleration co-processor; and
in response to the temperature of the acceleration co-processor exceeding a reference temperature, delaying the sending of the command completion entry to the host.

7. The method of claim 6, wherein the delaying of the sending of the command completion entry comprises delaying the sending of the command completion entry until the temperature of the acceleration co-processor is below the reference temperature.

8. The method of claim 6, wherein the delaying of the sending of the command completion entry comprises delaying the sending of the command completion entry for a period of time.

9. The method of claim 1, further comprising:
receiving a plurality of completion messages from a plurality of acceleration kernels;
comparing the received completion messages with the AER commands in the look-up table;
coalescing the received completion messages having matching AER commands in the look-up table into a single command completion entry; and
sending the single command completion entry to the host.

10. The method of claim 9, wherein the single command completion entry is configured to alert the host that the plurality of acceleration kernels are idle.

11. A system comprising:
a host;
a storage device comprising a controller and a memory device; and
an acceleration co-processor configured to accelerate the storage device, the acceleration co-processor comprising a plurality of acceleration kernels,
wherein the host is configured to task the acceleration kernels with operations and to send asynchronous event reporting (AER) commands corresponding to the operations to the controller,
wherein the controller is configured to build a look-up table comprising the received AER commands,
wherein the acceleration kernels are configured to send completion messages to the controller after completing their respective operations, and
wherein the controller is configured to determine whether a received completion message matches an AER command in the look-up table and, based on a match being found, the controller is further configured send a command completion entry to the host corresponding to the received completion message.

12. The storage device of claim 11, wherein the acceleration co-processor is integral with the controller.

13. The storage device of claim 11, wherein the command completion entry is sent via the NVMe protocol.

14. The storage device of claim 11, wherein the controller is configured to monitor a temperature of the acceleration co-processor and, in response to the temperature of the acceleration co-processor exceeding a reference temperature, to delay the sending of the command completion entry.

15. The storage device of claim 11, wherein the acceleration co-processor is configured to send the completion messages to the controller via a system management bus or an I2C bus.

16. The storage device of claim 15, wherein the host and the controller are configured to communicate with each other via the PCIe bus.

17. The storage device of claim 11, wherein the host is configured to concurrently task at least one of the acceleration kernels with a first operation and send an AER command corresponding to the first operation to the controller.

18. A method of status monitoring for acceleration kernels in a storage device in a system, the system comprising a host, an acceleration co-processor comprising the acceleration kernels, and the storage device, the method comprising:
receiving a first operation from the host by a controller of the storage device;
passing the first operation onto a first acceleration kernel from among the acceleration kernels in the acceleration co-processor from the controller;
receiving an asynchronous event report (AER) command corresponding to the first operation from the host by the controller of the storage device;
reading the AER command and building a look-up table comprising the AER command corresponding to the first operation;
upon completion of the first operation by the first acceleration kernel in the acceleration co-processor, sending a completion message to the controller by the acceleration co-processor
receiving, by the controller, the completion message from the first acceleration kernel corresponding to the first operation;
comparing the received completion message to the AER command in the look-up table; and
in response to a match being found between the received the received completion message and the AER command in the look-up table, sending an AER command completion entry to the host from the controller.

19. The method of claim 18, wherein the acceleration co-processor is integrated in the controller.

20. The method of claim 18, wherein the AER command completion entry is configured to inform the host that the first operation is completed.

21. The method of claim 18, wherein the acceleration co-processor sends the completion message to the controller over a system management bus.

22. The method of claim 18, wherein the controller is configured to enable quality of service (QoS) with respect to the acceleration kernels.

23. The method of claim 18, further comprising receiving a status update message at the controller from one of the acceleration kernels after a period of time has passed since the first operation was passed to the acceleration co-processor.

24. The method of claim 18, further comprising:
   receiving a status update message at the controller from one of the acceleration kernels after a percentage of data processing is done after the first operation was passed to the acceleration co-processor; and
   sending an AER command completion entry to the host indicating the status of the one of the acceleration kernels.

* * * * *